United States Patent
Cho (10) Patent No.: US 12,392,408 B2
(45) Date of Patent: Aug. 19, 2025

(54) METHOD AND DEVICE FOR COMPENSATING FOR CONTROL REACTIVITY OF SHIFT-BY-WIRE SYSTEM

(71) Applicant: HYUNDAI KEFICO CORPORATION, Gyeonggi-do (KR)

(72) Inventor: Hyoung-Sang Cho, Gyeonggi-do (KR)

(73) Assignee: Hyundai Kefico Corporation, Gyeonggi-Do (KR)

(*) Notice: Subject to any disclaimer, the term of this patent is extended or adjusted under 35 U.S.C. 154(b) by 582 days.

(21) Appl. No.: 17/665,153

(22) Filed: Feb. 4, 2022

(65) Prior Publication Data

US 2022/0252150 A1    Aug. 11, 2022

(30) Foreign Application Priority Data

Feb. 5, 2021 (KR) .................. 10-2021-0016908

(51) Int. Cl.
*F16H 61/28* (2006.01)
*F16H 61/32* (2006.01)

(52) U.S. Cl.
CPC ......... *F16H 61/2807* (2013.01); *F16H 61/32* (2013.01); *F16H 2061/326* (2013.01)

(58) Field of Classification Search
CPC . F16H 61/2807; F16H 61/32; F16H 2061/326
See application file for complete search history.

(56) References Cited

U.S. PATENT DOCUMENTS

2007/0144287 A1* 6/2007 Kimura .................. F16H 61/32
                                                       74/335
2019/0178373 A1* 6/2019 Choi ........................ H02P 25/08

FOREIGN PATENT DOCUMENTS

| JP | 2004-019804 A | 1/2004 |
| KR | 10-2012-0000829 A | 1/2012 |
| KR | 10-2015-0062167 A | 6/2015 |
| KR | 10-2016-0051033 A | 5/2016 |
| KR | 10-2019-0067404 A | 6/2019 |
| KR | 10-2020-0062730 A | 6/2020 |

* cited by examiner

*Primary Examiner* — Tarek Elarabi
(74) *Attorney, Agent, or Firm* — Fox Rothschild LLP (57) ABSTRACT

A method is configured to compensate control reactivity of a shift-by-wire system in which shift ranges of an automatic transmission are changed by a motor. The method for compensating control reactivity may ensure a consistent response of the motor by including a compensation logic that measures a necessary driving time of the motor that was taken to rotate a detent plate from a current position to a target range, determines whether the motor is in an over-response state or an under-response state by comparing the measured taken time with a pre-stored setting value, accumulates an over-response or under-response detection count, performs compensation of decreasing or increasing an instruction value (a duty value) of the motor in accordance with the accumulated over-response or under-response detection count.

9 Claims, 6 Drawing Sheets

METHOD AND DEVICE FOR COMPENSATING FOR CONTROL REACTIVITY OF SHIFT-BY-WIRE SYSTEM

CROSS REFERENCE TO RELATED APPLICATION

The present application claims under 35 U.S.C. § 119(a) the benefit of Korean Patent Application No. 10-2021-0016908, filed Feb. 5, 2021, the entire contents of which are incorporated by reference herein.

BACKGROUND

(a) Technical Field

The present disclosure relates to a method and device for compensating for control reactivity of a shift-by-wire (SBW) system, more particularly, to the method and device for compensating for control reactivity of the shift-by-wire system in which shift ranges are changed by a motor.

(b) Description of the Related Art

According to a shift-by-cable (SBC) type automatic transmission that is a shift range change type of automatic transmission in the related art, when a shift lever is moved, a detent plate is rotated by a cable, a manual valve is opened, and P-, R-, N-, and D-channels in a valve body are opened, whereby a desired shift range is selected. However, since a position of a cable should be considered in the SBC type of the related art, the design is limited based on the position of the cable, and it may be disadvantageous in terms of assembly and mass production.

A shift-by-wire type is a substitute for the SBC type in the related art. The SBW type is a technology capable of providing convenience for operation and improved safety by rotating a detent plate using a motor instead of a cable connected to the shift lever at a driver seat. The SBW type is configured such that an operation state of a shift lever is detected by a sensor or a switch and a detent plate is rotated by a motor to operate a manual valve.

The detent plate has a plurality of shift ranges in which a detent roller can be statistically stabilized by a detent spring in the SBW type. The motor rotates the detent plate to appropriate positions in response to a request for changing shift ranges by a driver operating a shift lever to implement specific mechanical states of the vehicle system, whereby states desired by the driver, such as parking and driving, are implemented.

When a driver inputs a desired shift range through a shift lever, it takes some time for a vehicle control unit to receive the input, determine a control value of a motor (a control valve including a rotation direction and a rotation angle (a displacement amount of a detent plate), and actually engage the desired shift range by driving the motor on the basis of the determined control value. The timing of this process generally varies based on responsiveness of the motor.

A driver can also immediately recognize responsiveness of a motor when changing shift ranges, in particular, because there is a slight time difference between a point in time when a shift lever finishes being operated and a point in time when range information is displayed through a cluster, etc. after a range is actually engaged. However, if the responsiveness is not consistent, problems with quality are generated, which may cause deterioration of the commercial value of the vehicle.

In order to solve inconsistency of the responsiveness of a motor in the related art, a technology of performing compensation through the voltage and temperature of predictable components, which can influence the responsiveness of a motor, for example, has been known. However, compensation through the voltage and temperature of the motor has limitations in solving the problem of inconsistency of responsiveness due to differences in the parts across different motors or a duration problem such as corrosion of parts related to shifting.

SUMMARY

An objective of the present disclosure is to provide a method and device for compensating for control reactivity of a shift-by-wire system, the method and device configured to solve the problem of inconsistency of responsiveness in the related art by appropriately compensating responsiveness in accordance with a response speed when shift ranges are changed in response to a request from a driver.

In order to achieve the objectives, according to an embodiment of the present disclosure, a method for compensating control reactivity of a shift-by-wire system in which shift ranges of an automatic transmission are changed by a motor, includes: (a) a necessary time measuring step of measuring a necessary driving time of the motor that was taken to rotate a detent plate from a current position to a target range; (b) a reactivity determining step of determining whether the motor is in an over-response state or an under-response state by comparing the measured taken time with a pre-stored setting value; (c) a detection count accumulating step of accumulating an over-response or under-response detection count; and (d) a motor instruction compensating step of decreasing or increasing an instruction value (a duty value) of the motor in accordance with the accumulated over-response or under-response detection count.

In step (a), the taken time may start to be measured at the point in time when the motor starts to be driven and measurement may be finished at the point in time when the motor enters or reaches the target range.

In step (b), under-response may be determined when the measured taken time exceeds the setting value, and over-response may be determined when the measured taken time is smaller than the setting value.

The setting value may be determined as different values in accordance with the positions of target ranges that are set by a driver operating a shift lever.

When over-response is determined in step (b), the over-response detection count may be accumulated and the under-response detection count may be initialized in step (c).

When under-response is determined in step (b), the under-response detection count may be accumulated and the over-response detection count may be initialized in step (c).

In step (d), when the accumulated over-response detection count exceeds a setting count, a previous instruction value (duty value) of the motor may be decreased to a pre-set specific instruction value (compensation duty value) and the accumulated over-response detection count may be initialized.

In step (d), when the accumulated under-response detection count exceeds a setting count, a previous instruction value (duty value) of the motor may be increased to a pre-set specific instruction value (compensation duty value) and the accumulated under-response detection count may be initialized.

The method for compensating control reactivity of a shift-by-wire system according to an embodiment of the present disclosure may further include (e) a compensation state memorizing step of storing the accumulated over-response or under-response detection count or the decreased or increased instruction value (a duty value) of the motor in a storage device.

In order to achieve the objectives, according to an embodiment of the present disclosure, a method for compensating control reactivity of a shift-by-wire system in which shift ranges of an automatic transmission are changed by a motor, includes: (a') a speed deriving step of deriving an average rotation speed of the motor until a detent plate enters a target range from a current position; (b') a reactivity determining step of determining whether the motor is in an over-response state or an under-response state by comparing the derived average rotation speed of the motor with a pre-stored setting value; (c') a detection count accumulating step of accumulating an over-response or under-response detection count; and (d') a motor instruction compensating step of decreasing or increasing an instruction value (a duty value) of the motor in accordance with the accumulated over-response or under-response detection count.

In step (a'), an average value of a rotation speed of an output shaft of the motor may be calculated and derived as the average rotation speed from the point in time when the motor starts to be driven and the point in time when the motor enters or reaches the target range.

In step (b'), under-response may be determined when the average rotation speed exceeds the setting value, and over-response may be determined when the measured taken time is smaller than the setting value.

The setting value may be determined as the same value regardless of positions of target ranges that are set by a driver operating a shift lever.

When over-response is determined in step (b'), the over-response detection count may be accumulated and the under-response detection count is initialized in step (c').

When under-response is determined in step (b'), the under-response detection count may be accumulated and the over-response detection count may be initialized in step (c').

In step (d'), when the accumulated over-response detection count exceeds a setting count, a previous instruction value (duty value) of the motor may be decreased to a pre-set specific instruction value (compensation duty value) and the accumulated over-response detection count may be initialized.

In step (d'), when the accumulated under-response detection count exceeds a setting count, a previous instruction value (duty value) of the motor may be increased to a pre-set specific instruction value (compensation duty value) and the accumulated under-response detection count may be initialized.

The method for compensating control reactivity of a shift-by-wire system according to an embodiment of the present disclosure may further include (e') a compensation state memorizing step of storing the accumulated over-response or under-response detection count or the decreased or increased instruction value (a duty value) of the motor in a storage device.

In order to achieve the objectives, according to another embodiment of the present disclosure, a method for compensating control reactivity of a shift-by-wire system in which shift ranges of an automatic transmission are changed by a motor, includes: (a") a necessary time measuring step of measuring a necessary driving time of the motor that was taken to rotate a detent plate from a current position to a target range; (b") a reactivity determining step of determining whether the motor is in an over-response state or an under-response state by comparing the measured taken time with a pre-stored setting value; and (c") a motor instruction compensating step of decreasing or increasing an instruction value (a duty value) of the motor in accordance with whether it is over-response or under-response.

In step (a"), the taken time may start to be measured at the point in time when the motor starts to be driven and measurement may be finished at the point in time when the motor enters or reaches the target range.

In step (b"), under-response may be determined when the measured taken time exceeds the setting value, and over-response may be determined when the measured taken time is smaller than the setting value.

The setting value may be determined as different values in accordance with the positions of target ranges that are set by a driver operating a shift lever.

When over-response is determined in step (b"), a previous instruction value (duty value) of the motor may be decreased to a pre-set specific instruction value (duty value) in step (c").

When under-response is determined in step (b"), a previous instruction value (duty value) of the motor may be increased to a pre-set specific instruction value (duty value) in step (c").

In order to achieve the objectives, according to another aspect of the present disclosure, a device for compensating control reactivity of a shift-by-wire system in which shift ranges of an automatic transmission are changed by a motor, includes: a motor configured to generate a driving force for rotating a detent plate to a target range; a Hall sensor and an encoder installed at the motor and configured to detect a current position of the detent plate and whether the detent plate enters a target range; and a shift-by-wire (SBW) controller configured to set a target range by analyzing a signal received from the outside and signals from the Hall sensor and the encoder, and configured to control operation of the motor such that the detent plate can be rotated toward the set target range, in which the SBW controller determines reactivity of the motor to determine whether the motor is in an over-response state or an under-response state on the basis of a necessary driving time of the motor, which was taken to rotate the detent plate from a current position to a target range, or an average rotation speed of the motor, and decreases or increases an instruction value (a duty value) of the motor in accordance with whether it is an over-response or an under-response.

The SBW controller may include: a driving information deriver configured to measure a necessary driving time of the motor that was taken to rotate the detent plate from a current position to a target range or configured to derive an average rotation speed of the motor; a driving information deriver configured to measure a necessary driving time of the motor that was taken to rotate the detent plate from a current position to a target range or configured to derive an average rotation speed of the motor; a detection count accumulator configured to accumulate an over-response or under-response detection count; and a motor instruction compensator configured to decrease or increase an instruction value (a duty value) of the motor in accordance with the accumulated over-response or under-response detection count.

The driving information deriver may start to measure a taken time at the point in time when the motor starts to be driven and finish measurement at the point in time when the motor enters or reaches a target range, or may calculate and derive an average value of a rotation speed of the motor as the average rotation speed from the point in time when the motor starts to be driven and the point in time when the motor enters or reaches the target range.

The reactivity determiner may determine under-response when the measured taken time or the derived average rotation speed of the motor exceeds a setting value, and may determine over-response when the measured taken time or the derived average rotation speed of the motor is smaller than the setting value.

The setting value may be determined as different values in accordance with the positions of target ranges that are set by a driver operating a shift lever.

When the reactivity determiner determines over-response, the detection count accumulator may accumulate the over-response detection count and may initialize the under-response detection count.

When the reactivity determiner determines under-response, the detection count accumulator may accumulate the under-response detection count and may initialize the over-response detection count.

When the accumulated over-response detection count exceeds a setting count, the motor instruction compensator may decrease a previous instruction value (duty value) of the motor to a pre-set specific instruction value (compensation duty value) and may initialize the accumulated over-response detection count.

When the accumulated under-response detection count exceeds a setting count, the motor instruction compensator may increase a previous instruction value (duty value) of the motor to a pre-set specific instruction value (compensation duty value) and may initialize the accumulated under-response detection count.

The device for compensating control reactivity of a shift-by-wire system may further include a compensation state memory configured to store the accumulated over-response or under-response detection count or the decreased or increased instruction value (a duty value) of the motor.

The device and method for compensating for control reactivity of a shift-by-wire system according to the present disclosure obtain information about responsiveness of a motor from an average rotation speed or a necessary driving time of the motor which was taken to rotate a detent plate from the current position to a target range, and decrease or increase the instruction value of the motor on the basis of the information, thereby being able to solve the problem of inconsistent responsiveness due to differences of parts or a duration problem such as corrosion of parts related to shifting.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure are described in detail with reference to the drawings.

The terminology used herein is for the purpose of describing particular embodiments only and is not intended to limit the present disclosure. Singular forms are intended to include plural forms unless the context clearly indicates otherwise.

Terms used in the specification, "first", "second", etc., may be used to describe various components, but the components are not to be construed as being limited to the terms. The terms are used only to distinguish one component from another component.

In the following description referring to the accompanying drawings, the same components are given the same reference numerals and are not repeatedly described. However, in describing the present disclosure, detailed descriptions of well-known technologies will be omitted so as not to obscure the description of the present disclosure with unnecessary detail.

The present disclosure is characterized securing consistency of response by obtaining information about responsiveness (a reaction speed) of a motor from the necessary driving time of a motor, which was taken to rotate a detent plate from the current position to a target range, or an average rotation speed of the motor, and by decreasing or increasing an instruction value (a duty value) of the motor on the basis of the information about the obtained responsiveness (reaction speed) in a shift-by-wire system.

First, the mechanical configuration of a range change mechanism of a shift-by-wire system is generally described.

Figure 1:
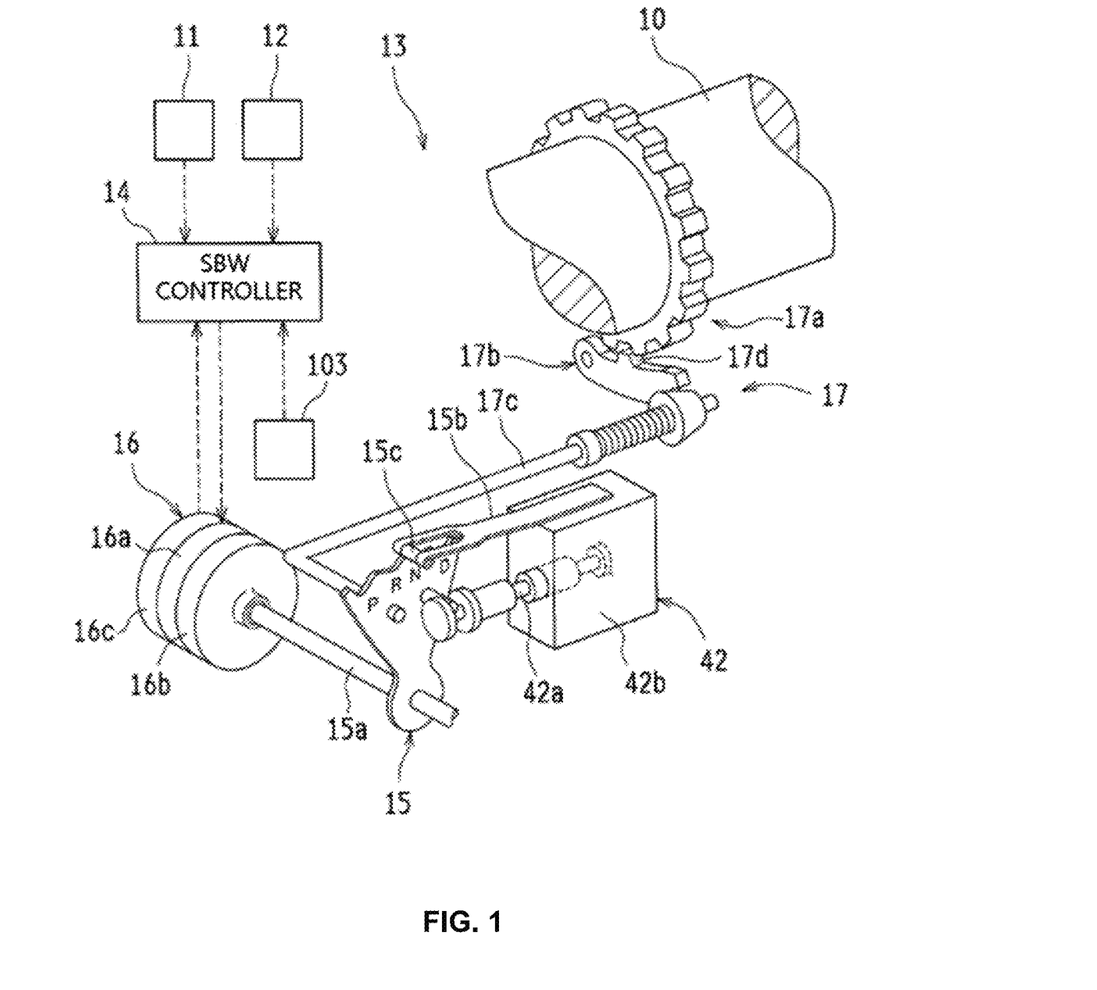
FIG. 1 is a perspective view showing a range change mechanism of a shift-by-wire system that is applied to an automatic transmission.

FIG. 1 is a perspective view showing a range change mechanism of a shift-by-wire system that is applied to an automatic transmission.

Referring to FIG. 1, a range change mechanism 13 includes a detent plate 15 that is operated to determine the position of a spool 42a of a manual valve 42, and a shift actuator 16 that generates a driving force for rotating the detent plate 15. The shift actuator 16 may be an electric type and is operated by power from a battery mounted in a vehicle in the same way as a starter motor (not shown).

The range change mechanism 13 is connected to a parking mechanism 17 to be able to operate together. The detent plate 15 of the range change mechanism 13 is rotated by the shift actuator 16 and pushes or pulls the spool 42a of the manual valve 42 or a parking rod 17c of the parking mechanism 17, thereby determining their positions. A detent mechanism is composed of the detent plate 15, a drive shaft 15a, and a detent spring 15b.

The detent spring 15b, as exemplified in the figures, may be supported on the valve body 42b of the manual valve 42 and the detent plate 15 may be formed substantially in a fan shape. The drive shaft 15a is fixed substantially perpendicularly through the area that is the rotational center of the detent plate 15 to be able to be rotated by the shift actuator 16.

A waved portion having continuous curved prominences and depressions is formed on the edge of the detent plate 15. A roller 15c of the detent spring 15b is inserted in a groove at a specific position on the waved portion, whereby the position is determined and maintained (a shift range is selected and maintained). Four grooves corresponding to range positions P, R, N, and D, respectively, of the manual valve 42 that is operated with the detent plate 15 may be formed at the waved portion on the edge of the detent plate 15.

The roller 15c of the detent spring 15b is inserted in any one of the four grooves when the shift lever 11 is operated by a driver. Accordingly, the detent plate 15 is maintained at positions determined to correspond to the positions of the manual valve 42, respectively, and the shift actuator 16 includes an electric motor 16a, a reducer 16b that reduces rotation of the electric motor, and an encoder 16c.

An output shaft (not shown) of the reducer 16b may be connected to the drive shaft 15a to rotate together by a spline, etc., and the parking mechanism 17 is operated to change an output shaft 10 of an automatic transmission 1 into a lock state in which it cannot rotate and an un-lock state in which it can rotate. The parking mechanism 17 includes a parking gear 17a formed on the edge of the output shaft 10, a parking lock pawl 17b, and parking rod 17c.

The fundamental operation of the range change mechanism 13 configured in this way is described hereafter.

When a driver of a vehicle manually operates the shift lever 11 or the parking switch 12, any one of the parking range P, the reverse range R, the neutral range N, and the drive range D of the automatic transmission 1 is selected. Accordingly, a signal is output from a shift lever position sensor 103 or the parking switch 12, and an SBW controller 14 receives the output signal and recognizes a selected target range P, R, N, or D.

The SBW controller 14 determines an instruction value (a duty value as a control value including a rotation direction and a rotation angle) of the shift actuator 16 on the basis of the information about the distance between the current position and a newly recognized target range P, R, N, or D, and rotates forward or backward the output shaft of the motor 16a by a predetermined angle on the basis of the determined instruction value. Accordingly, the drive shaft 15a and the detent plate 15 are rotated a predetermined angle.

For example, the neutral range N is changed to the drive range D by the shift lever, the target range signal is changed N→D. The SBW controller 14 receiving this signal sets a target rotation angle corresponding to the selected target range D, determines a corresponding instruction value (duty value), and allow for electricity transmission to the motor 16a by the determined instruction value.

Further, when electricity is transmitted, the motor 16a is driven, and the output shaft thereof is rotated, the SBW controller 14 receives a signal corresponding to the rotation angle in real time from the encoder 16c. The SBW controller recognizes the rotation amount and direction of the motor 16a in real time from the signal provided from the encoder 16c and performs feedback control on the motor 16a such that the rotation angle of the output shaft of the motor 16a becomes the same as the target rotation angle.

According to this control, the detent plate 15 is rotated counterclockwise by a predetermined angle in the figures, the roller 15c of the detent spring 15d is separated out of the groove of N, slides over one adjacent ridge, and is then inserted into the adjacent groove D. As a result, though not shown, the spool 42a of the manual valve 42 axially slides and the range of the manual valve 42 is changed N→D.

When a driver manually operates the parking switch 12 and the parking range P is selected, the parking rod 17c is pushed and the parking lock pawl 17b is lifted by rotation of the detent plate 15, whereby the claw 17d is inserted between teeth of the parking gear 17a. Accordingly, the output shaft 10 of the automatic transmission 1 is locked and the manual valve 42 is stopped at the position P.

Figure 2:
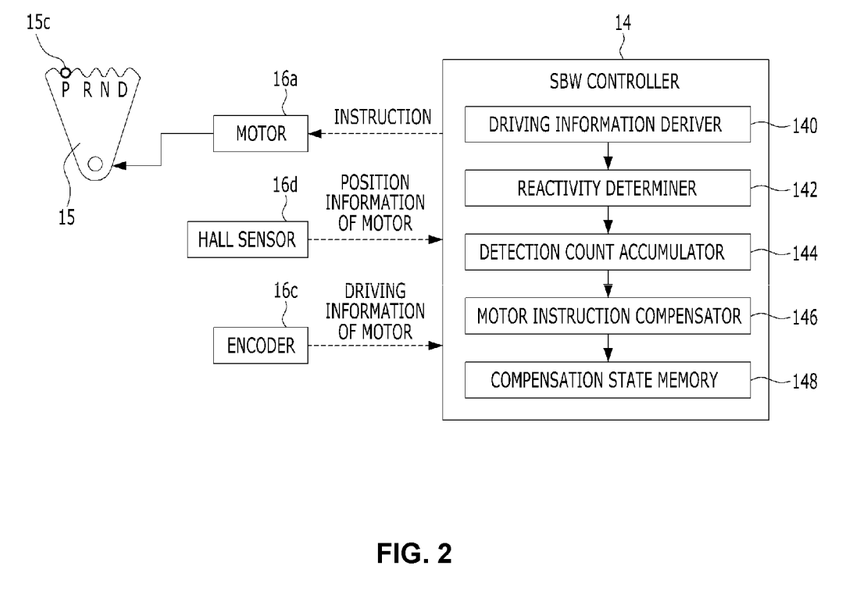
FIG. 2 is a block diagram of a device for compensating for control reactivity of a shift-by-wire system according to an embodiment of the present disclosure which is applied to a shift-by-wire system including the range change mechanism of FIG. 1.

A device for compensating for control reactivity of a shift-by-wire system according to an embodiment of the present disclosure which is applied to a shift-by-wire system including the range change mechanism is described hereafter with reference to FIG. 2.

FIG. 2 is a block diagram schematically showing the device for compensating for control reactivity of a shift-by-wire system according to an embodiment of the present disclosure.

Referring to FIG. 1, a device for compensating for control reactivity according to an embodiment of the present disclosure includes the motor 16a, encoder 16c, and SBW controller 14 described above. The motor 16a generates a driving force for rotating the detent plate 15 to target ranges and the SBW controller 14 recognizes the current position of the detent plate 15 and whether the detent plate 15 enters a target range on the basis of signals from a Hall sensor 16d for the motor 16 and the encoder 16c.

The SBW controller 14, as described above, sets a target range on the basis of a signal received from the outside when the shift lever 11 is manually operated (a position signal of the shift lever 11). The SBW controller 14 controls operation of the motor 16a so that the detent plate 15 can be rotated toward the set target range, recognizes the rotation angle of the motor on the basis of a signal from the encoder 16c when the motor 16a is rotated, and performs feedback control on the motor 16a such that the rotation angle becomes the same as the target rotation angle.

In particular, the SBW controller 14 determines reactivity (responsiveness) of the motor 16a on the basis of specific information that is detected when rotating the detent plate 15 to a target range from the current position. The SBW controller 14 performs correction of decreasing or increasing an instruction value (a duty value) of the motor 16a, depending on the determination result (the result of determining whether the reactivity is larger or smaller than a value set in the step of design).

The specific information that is used to determine the reactivity (responsiveness) of the motor 16a may be a necessary driving time of the motor 16a which was used for rotating the detent plate 15 from the current position to a target range or the average rotation speed of the motor 16a when the detent plate 15 is rotated to the target range from the current position. The SBW controller 14 determines reactivity of the motor 16a by comparing the specific information with a predetermined setting value.

When the necessary driving time of the motor 16a or the average rotation speed of the motor 16a exceeds a setting value that may be set for the necessary driving time or the average rotation speed, the SBW controller 14 determines that the reaction of the motor 16a is slow (hereafter, referred to as 'under-response'), and increases the instruction value (duty value) of the motor 16a by a specific value. However, when necessary driving time or the average rotation speed is smaller than the setting value, the SBW controller 14 determines that reaction of the motor 16a is fast (hereafter, referred to as 'over-response'), and decreases the instruction value (duty value) of the motor 16a by a specific value.

To this end, the SBW controller 14 may include two or more processors that are operated by programs constructed to be able to a series of reactivity compensation procedures to be described below step by step. The processors include a driving information deriver 140 that derives driving information of the motor 16a, and a reactivity determiner 142 that determines reactivity of the motor 16a. Further, a detection count accumulator 144 and a motor instruction compensator 146 may be included.

When the necessary driving time of the motor 16a is set as a reactivity determination reference, the driving information deriver 140 measures the necessary driving time of the motor 16a which was taken to rotate the detent plate 15 from the current position to a target range. The measured taken time is derived as driving information. The taken time starts to be measured at the point in time when the motor 16a starts to be driven and measurement is finished at the point in time when the motor 16a enters or reaches a target range.

However, when the average rotation speed of the motor 16a is set at a reactivity determination reference, the average rotation speed of the motor 16a when the detent plate 15 is rotated from the current position to a target range may also be derived as driving information. It is possible to calculate and derive the average value of the rotation speed of the motor 16a from the point in time when the motor 16a starts to be driven to the point in time when the motor 16a enters or reaches a target range as the average rotation speed.

The reactivity determiner 142 determines whether the motor 16a is in the over-response state or under-response state by comparing the necessary driving time of the motor 16a or the average rotation speed of the motor 16a derived by the driving information deriver 140 with a pre-stored setting value. In more detail, under-response is determined when the measured taken time or the derived average rotation speed of the motor 16a exceeds a setting value, and over-response is determined when it is smaller than the setting value.

When the necessary driving time of the motor 16a is set as a reactivity determination reference, the setting value may be set as another value in accordance with the position of the target range that is set by a driver operating the shift lever 11. In more detail, the farther the target range from the current position, the larger the setting value may be determined. For example, a larger value can be set when the shift range is changed from P to N than when it is changed from P to R.

On the other hand, when the average rotation speed of the motor 16a (the average rotation speed of the motor 16a until the detent plate 15 enters a target range from the current position) is set as the reactivity determination reference, the setting value may be determined as the same value regardless of the positions of target ranges that are set by a driver operating the shift lever 11. This is because the average rotation speed in the rotation range is taken as a determination reference regardless of the rotation displacement amount.

Determination information (information about determining over-response or under-response) by the reactivity determiner 142 is input to the detection count accumulator 144. The detection count accumulator 144 accumulates the detection count of over-response or under-response determined by the reactivity determiner 142. For example, the detection count accumulator 144 accumulates an over-response detection count when the reactivity determiner 142 determines over-response, and accumulates an under-response detection count when the reactivity determiner 142 determines under-response.

When the reactivity determiner 142 determines over-response as the result of determining responsiveness of the motor 16a through comparison with a setting value, the detection count accumulator 144 may accumulate the over-response detection count and initialize the under-response detection count. When the reactivity determiner 142 determines under-response, the detection count accumulator 144 may accumulate the under-response detection count and initialize the over-response detection count.

Figure 3:
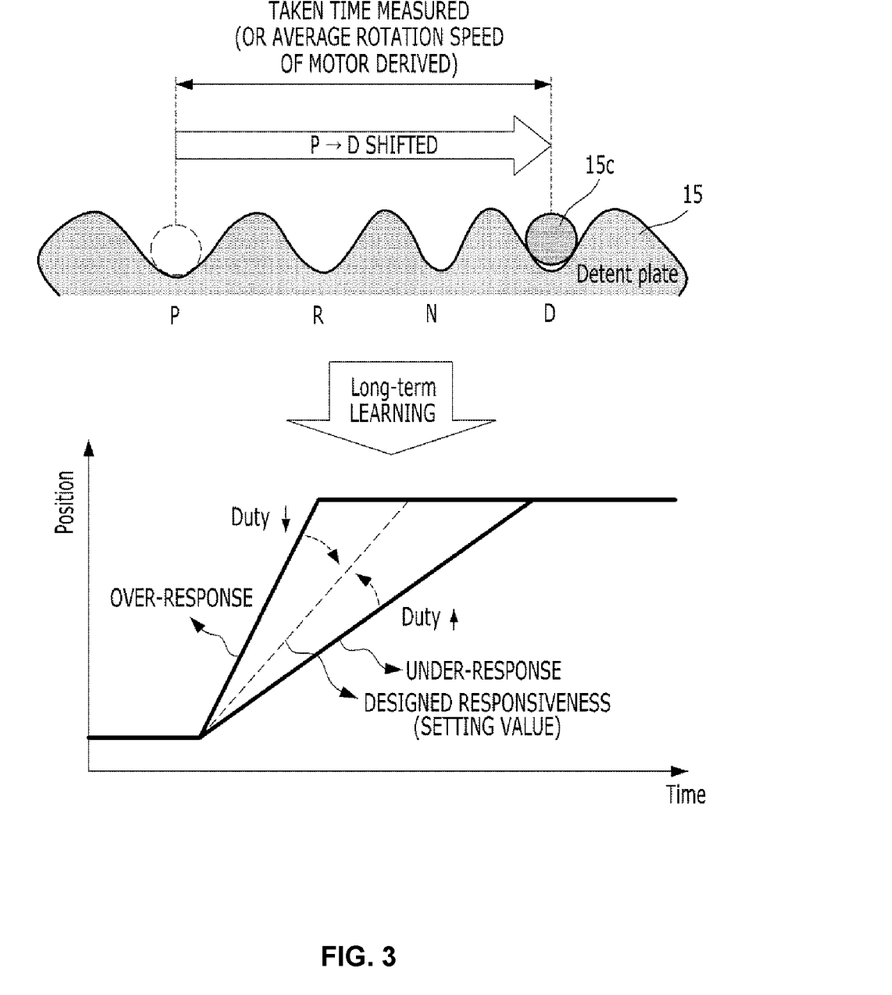
FIG. 3 is an exemplary view illustrating measurement of responsiveness of a motor and compensation for a motor instruction value (duty value).

The information about the accumulated over-response or under-response detection count is provided to the motor instruction compensator 146. The motor instruction compensator 146 increases the reaction speed of the motor 16a higher than the current reaction speed by increasing the instruction value (duty value) of the motor 16a, as exemplified in FIG. 3, or decreases the reaction speed of the motor 16a lower than the current reaction speed by decreasing the instruction value (duty value) of the motor 16a, depending in the accumulated under-response or over-response detection count.

In detail, when the accumulated over-response detection count exceeds a setting count, the motor instruction compensator 146 decreases the previous instruction value (duty value) of the motor 16a to a preset specific instruction value (a compensation duty value) and initializes the accumulated over-response detection count. On the other hand, when the accumulated under-response detection count exceeds a setting count, the motor instruction compensator 146 increases the previous instruction value (duty value) of the motor 16a to a preset specific instruction value (a compensation duty value) and initializes the accumulated under-response detection count.

The accumulated detection count that is the instruction value compensation reference of the motor 16a (the accumulated over-response or under-response detection count) may be changed in accordance with the specifications or the actual mounting environment on a vehicle of the shift actuator including the motor 16a, so it is not limited to a specific count. Different optimal counts for instruction value compensation for the specification or the actual mounting environment on a vehicle of the shift actuator may be applied to vehicles through experiments or simulations.

Meanwhile, the device for compensating for control reactivity of a shift-by-wire system according to an embodiment of the present disclosure may further include a compensation state memory 148. The compensation state memory 148 stores the over-response or under-response detection count accumulated by the detection count accumulator 144 and the instruction value (duty value) of the motor 16a decreased or increased by the motor instruction compensator, thereby preparing for dangers due to an unexpected instantaneous external disturbance or statistic noise.

The compensation state memory 148 may be one of common storage media. For example, in various embodiments, the compensation state memory 148 may be at least one type of storage medium of flash memory type, hard disk type, multimedia card micro type, and card type memories (e.g., an SD or XD memory), a RAM (Random Access Memory) an SRAM (Static Random Access Memory), a ROM (Read-Only Memory), an EEPROM (Electrically Erasable Programmable Read-Only Memory), a PROM (Programmable Read-Only Memory), a magnetic memory, a magnetic disc, and an optical disc.

A control reactivity compensation process that is performed by the device for compensating for control reactivity of a shift-by-wire system according to an embodiment of the present disclosure described above is described with reference to FIG. 4. For the convenience of description, the components shown in FIGS. 1 and 2 are described with reference to their reference numerals.

Figure 4:
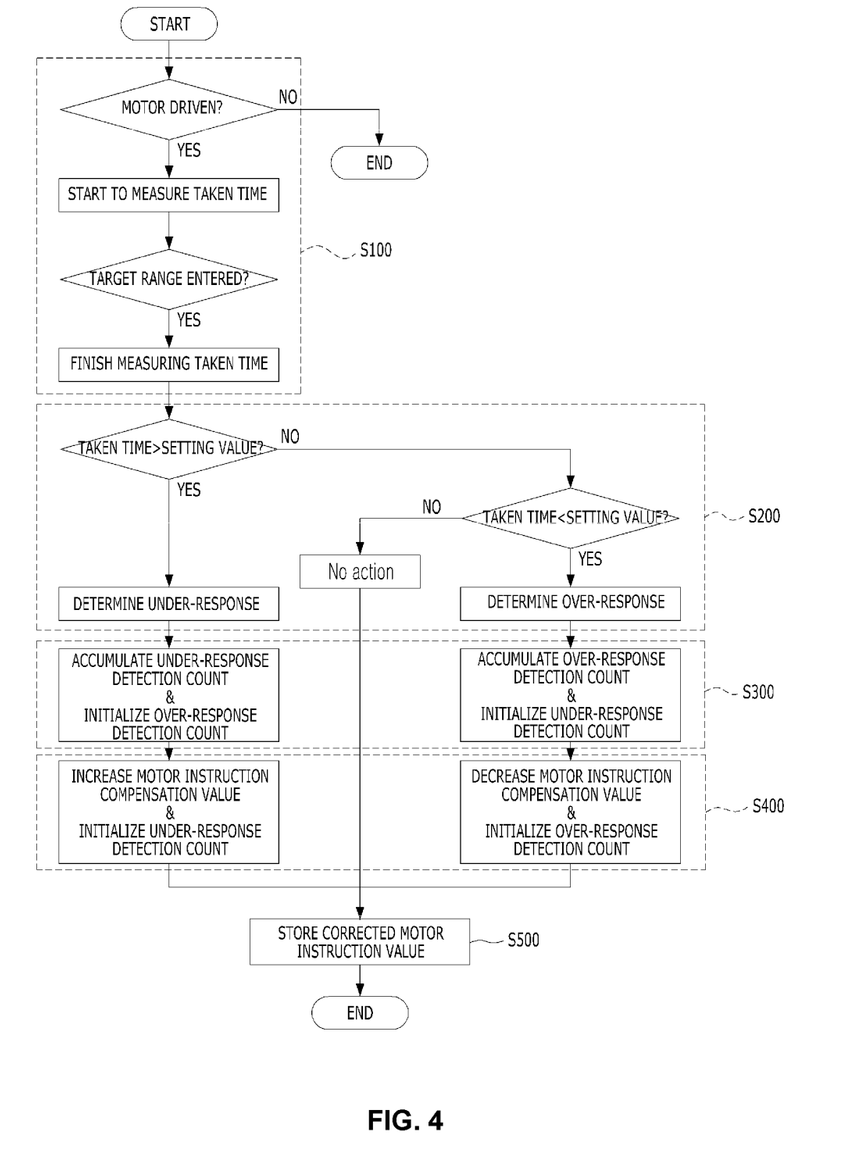
FIG. 4 is a flowchart showing a method for compensating for control reactivity of a shift-by-wire system according to an exemplary embodiment of the present disclosure.

FIG. 4 is a flowchart showing a control reactivity compensation process for a shift-by-wire system according to an embodiment of the present disclosure, that is, a flowchart showing a process of determining control reactivity of the motor 16a and compensating for an instruction value of the motor 16a on the basis of the necessary driving time of the motor 16a which was taken to rotate the detent plate 15 from the current position to a target range.

Referring to FIG. 4, the method for compensating for control reactivity of a shift-by-wire system according to the present disclosure starts with a necessary time measuring step S100 of measuring a necessary driving time of the motor 16a that was taken to rotate the detent plate 15 from the current position to a target range. In step S100, the taken time starts to be measured at the point in time when the motor 16a starts to be driven and measurement is finished at the point in time when the motor 16a enters or reaches a target range.

The information (the necessary driving time of the motor 16a that was taken to rotate the detent plate 15 from the current position to a target range) measured in step S100 is used as a comparison value to be compared with a setting value in the next reactivity determining step S200. In step S200, whether the motor 16a is in the over-response state or the under-response state is determined by comparing the measured taken time with a pre-stored setting value.

In step S200, in detail, under-response in which the current driving speed of the motor 16a is lower than an appropriate speed (a designed value) is determined when the measured taken time exceeds the setting value, and over-response in which the current driving speed of the motor 16a is higher than the appropriate speed (a designed value) when the measured taken time is larger than the setting value. The setting value may be determined as different values in accordance with the positions of target ranges that are set by a driver operating the shift lever 11.

The setting value may be determined as different values in accordance with the positions of target ranges that are set by a driver operating the shift lever 11. In more detail, the farther the target range from the current position, the larger the setting value may be determined. For example, a larger value can be set when the shift range is changed from P to N than when it is changed from P to R.

Next, a detection count accumulating step S300 of accumulating the count of under-response or over-response detected in step S200 is performed. In step S300, the over-response detection count is accumulated and the under-response count is initialized when over-response is determined, whereas the under-response detection count is accumulated and the over-response detection count is initialized when under-response is determined.

The last step of the control reactivity compensation process of a shift-by-wire system according to an embodiment of the present disclosure is motor instruction compensation step S400. In the motor instruction compensation step S400, instruction compensation of decreasing or increasing the instruction value (duty value) of the motor 16a to a specific instruction value in accordance with the over-response or under-response detection count accumulated in step S300 is performed.

In step S400, when the accumulated over-response detection count exceeds a setting count, the previous instruction value (duty value) of the motor 16a is decreased to a predetermined specific instruction value (compensation duty value) and the accumulated over-response detection count is initialized, and when the under-response detection count exceeds a setting count, the previous instruction value (duty value) of the motor 16a is increased to the predetermined specific instruction value (compensation duty value) and the accumulated under-response detection count is initialized.

Depending on some cases, a compensation state memorizing step S500 of storing the accumulated over-response or under-response detection count and the decreased or increased instruction value (duty value) of the motor 16a is stored in a storage device may be included. That is, by storing the accumulated over-response or under-response detection count and the decreased or increased instruction value of the motor 16a, it is possible to prepare for dangers due to an unexpected instantaneous external disturbance or statistic noise.

Figure 5:
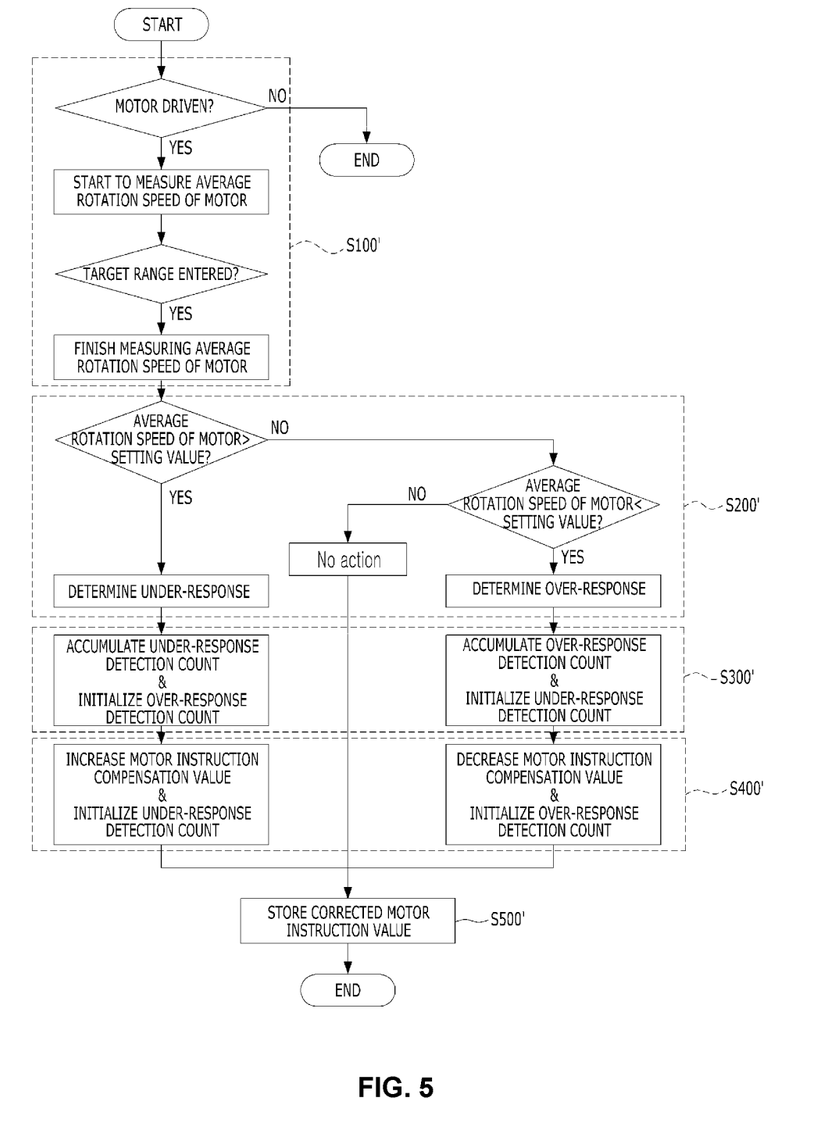
FIG. 5 is a flowchart showing a method for compensating for control reactivity of a shift-by-wire system according to another exemplary embodiment of the present disclosure.

FIG. 5 is a flowchart showing another example of a control reactivity compensation process for a shift-by-wire system according to an embodiment of the present disclosure, that is, a flowchart showing a process of determining control reactivity of the motor 16a and compensating for an instruction value of the motor 16a on the basis of the average rotation speed of the motor 16a when the detent plate 15 is rotated from the current position to a target range.

Referring to FIG. 5, the method for compensating for control reactivity of a shift-by-wire system according to another embodiment starts with a speed deriving step (S100') of deriving an average rotation speed of the motor 16a until the detent plate 15 enters a target range from the current position.

In step S100', it is possible to calculate and derive the average value of the rotation speed of the output shaft of the motor 16a from the point in time when the motor 16a starts to be driven to the point in time when the motor 16a enters or reaches a target range as the average rotation speed. The rotation speed of the output shaft of the motor 16a can be easily derived from an output signal of the encoder 16c and a reduction ratio (designed value) of the reduction mechanism.

The information (the average rotation speed of the motor 16a until the detent plate 15 enters a target range from the current position) derive in step S100' is used as a comparison value to be compared with a setting value in the next reactivity determining step S200'. In step S200', whether the motor 16a is in the over-response state or the under-response state is determined by comparing the derived average rotation speed of the motor 16a with a pre-stored setting value.

In step S200', in detail, under-response in which the current driving speed of the motor 16a is lower than an appropriate speed (a designed value) is determined when the measured taken time exceeds the setting value, and over-response in which the current driving speed of the motor 16a is higher than the appropriate speed (a designed value) when the measured taken time is larger than the setting value. The setting value may be determined as the same value regardless of the positions of target ranges that are set by a driver operating the shift lever 11.

Next, a detection count accumulating step S300' of accumulating the count of under-response or over-response detected in step S200' is performed. In step S300', the over-response detection count is accumulated and the under-response count is initialized when over-response is determined, whereas the under-response detection count is accumulated and the over-response detection count is initialized when under-response is determined.

The last step of the control reactivity compensation process of a shift-by-wire system according to the embodiment is also motor instruction compensation step S400'. In the motor instruction compensation step S400', instruction compensation of decreasing or increasing the instruction value (duty value) of the motor 16a to a specific instruction value in accordance with the over-response or under-response detection count accumulated in step S300' is performed.

In step S400', when the accumulated over-response detection count exceeds a setting count, the previous instruction value (duty value) of the motor 16a is decreased to a predetermined specific instruction value (compensation duty value) and the accumulated over-response detection count is initialized, and when the under-response detection count exceeds a setting count, the previous instruction value (duty value) of the motor 16a is increased to the predetermined specific instruction value (compensation duty value) and the accumulated under-response detection count is initialized.

Depending on some cases, a compensation state memorizing step S500' of storing the accumulated over-response or under-response detection count and the decreased or increased instruction value (duty value) of the motor 16a is stored in a storage device may be included. That is, by storing the accumulated over-response or under-response detection count and the decreased or increased instruction value of the motor 16a, it is possible to prepare for dangers due to an unexpected instantaneous external disturbance or statistic noise.

Figure 6:
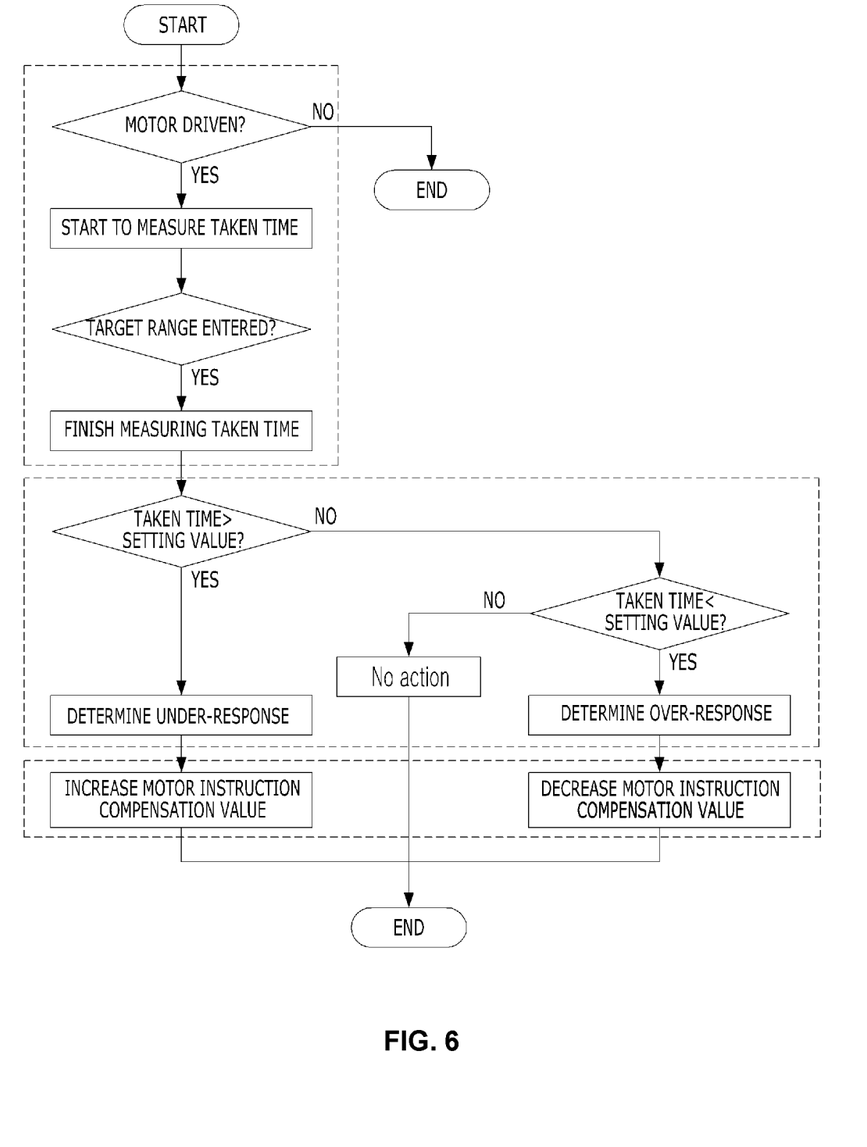
FIG. 6 is a flowchart showing a method for compensating for control reactivity of a shift-by-wire system according to another exemplary embodiment of the present disclosure.

FIG. 6 is a flowchart showing another example of the control reactivity compensation process of a shift-by-wire system according to an embodiment of the present disclosure.

The embodiment shown in FIG. 6 is configured, similar to the embodiment shown in FIG. 4, such that the control reactivity of the motor 16a is determined and the instruction value of the motor 16a is compensated on the basis of the necessary driving time of the motor 16a that was taken to rotate the detent plate 15 from the current position to a target range. However, FIG. 6 is a control flowchart programmed to be able to decrease or increase the instruction value of the motor 16a in real time when over-response or under-response is detected without the detection count accumulating step.

That is, the basic concept or configuration is the same as that of the embodiment shown in FIG. 4 except that the instruction value of the motor 16a is decreased or increased every time the detection count accumulating step is omitted and over-response or under-response is detected. Accordingly, repeated description is omitted.

In order to solve inconsistency of the responsiveness of a motor in the related art, a technology of performing compensation through the voltage and temperature of predictable components, which can influence the responsiveness of a motor, for example, a motor has been known. However, compensation through the voltage and temperature of a motor has limitation in solving the problem of inconsistency of responsiveness due to differences of the parts of the motor or a duration problem such as corrosion of parts related to shifting.

However, the device and method for compensating for control reactivity of a shift-by-wire system according to the present disclosure obtain information about responsiveness of a motor from an average rotation speed or a necessary driving time of the motor which was taken to rotate a detent plate from the current position to a target range, and decrease or increase the instruction value of the motor on the basis of the information, thereby being able to solve the problem of inconsistent responsiveness due to differences of the parts of the motor or a duration problem such as corrosion of parts related to shifting.

Only a specific embodiment was described in the above detailed description. The present disclosure should not be construed as being limited to the specific embodiment described above, but should be construed as including all changes, equivalents, and substitutions within the spirit of the present disclosure defined in the claims.

What is claimed is:

1. A method for compensating control reactivity of a shift-by-wire system in which shift ranges of an automatic transmission are changed by a motor, the method comprising:

sensing, by a shift level positioning sensor, a selected position of a shift lever and transmitting an output signal in response to the selected position of the shift lever;

receiving, by a controller, the output signal corresponding to the selected position of the shift lever;

determining, by the controller, a duty value of a motor corresponding to a rotation direction and a rotation angle;

measuring, by the controller, a necessary driving time of the motor that was taken to rotate a detent plate from a current position to a target range corresponding to the selected position of the shift lever;

determining, by the controller, whether the motor is in an over-response state or an under-response state by comparing the measured taken time with a pre-stored setting value;

accumulating, by the controller, an over-response detection count or an under-response detection count; and decreasing or increasing, by the controller, the duty value of the motor corresponding to the rotation direction or the rotation angle in accordance with the accumulated over-response detection count or the accumulated under-response detection count.

2. The method of claim 1, wherein the taken time starts to be measured at a point in time when the motor starts to be driven and measurement is finished at a point in time when the motor enters or reaches the target range.

3. The method of claim 1, wherein under-response is determined when the measured taken time exceeds the pre-stored setting value, and over-response is determined when the measured taken time is smaller than the pre-stored setting value.

4. The method of claim 1, wherein the pre-stored setting value is determined as different values in accordance with positions of target ranges that are set by a driver operating the shift lever.

5. The method of claim 1, wherein when over-response is determined, the over-response detection count is accumulated and the under-response detection count is initialized.

6. The method of claim 1, wherein when under-response is determined, the under-response detection count is accumulated and the over-response detection count is initialized.

7. The method of claim 1, wherein when the accumulated over-response detection count exceeds a setting count, a previous duty value of the motor is decreased to a pre-set specific duty value and the accumulated over-response detection count is initialized.

8. The method of claim 1, wherein when the accumulated under-response detection count exceeds a setting count, a previous duty value of the motor is increased to a pre-set specific duty value and the accumulated under-response detection count is initialized.

9. The method of claim 1, further comprising:
storing the accumulated over-response detection count or the accumulated under-response detection count or the decreased or increased duty value of the motor in a storage device.

* * * * *